Sept. 10, 1963  C. R. PATTERSON ET AL  3,103,354
CARBON INTERLEAVER AND GLUE TIPPING DEVICE
Filed Oct. 25, 1961  7 Sheets-Sheet 1

FIG. 1

INVENTORS
CHARLES R. PATTERSON
WILLIAM J. HEALY
BY

ATTORNEYS

FIG. 5

Sept. 10, 1963    C. R. PATTERSON ET AL    3,103,354
CARBON INTERLEAVER AND GLUE TIPPING DEVICE
Filed Oct. 25, 1961    7 Sheets-Sheet 5

INVENTORS
CHARLES R. PATTERSON
BY WILLIAM J. HEALY

*Byron Hume Groen + Clement*
ATTORNEYS

Sept. 10, 1963  C. R. PATTERSON ET AL  3,103,354
CARBON INTERLEAVER AND GLUE TIPPING DEVICE
Filed Oct. 25, 1961   7 Sheets-Sheet 6

INVENTORS
CHARLES R. PATTERSON
WILLIAM J. HEALY
BY
*Byron Hume Groen & Clement*
ATTORNEYS 3,103,354
CARBON INTERLEAVER AND GLUE
TIPPING DEVICE
Charles R. Patterson, Madison, Wis., and William J. Healy, Lisle, Ill.; said Healy assignor to said Patterson
Filed Oct. 25, 1961, Ser. No. 147,540
18 Claims. (Cl. 270—58)

This invention pertains to an improved device for interleaving carbon or the like sheet material between sheets of paper. It is directed more specifically to a mechanism which is uniquely adapted for attachment to a printing press or the like sheet handling machine whereby carbon sheets can be interleaved with printed sheets as they are delivered from the sheet handling machine and which mechanism additionally includes means for applying adhesive to corresponding edges of the sheets to thereby form sets each of which is constituted of a predetermined number of sheets.

The present invention is particularly adapted for, but not specifically limited to, the production of carbon interleaved business forms the manufacture of which represents an important and highly competitive segment of the printing industry. At the present time the vast majority of the business forms are produced on special web presses which are equipped to print, interleave, cut and glue the forms in one continuous high speed operation. Such machines are highly efficient and practical when the forms to be manufactured are of a standard size and when the volume of work is such that the presses can be maintained in substantially continuous operation. However, these presses have certain inherent limitations in that they are relatively limited as to the sizes and types of forms which they can produce and they also require a considerable length of time for makeready and the like preparations each time a new and different form is to be made. Therefore, it is economically impractical to use them to produce forms in special sizes or in relatively limited quantities.

It has been the practice, therefore, when relatively small orders are received for special size or personalized forms, to produce such work on sheet fed equipment which is much more flexible and is also more readily adaptable and economical for short run work. Nevertheless, in order to produce such forms at a reasonably competitive price, it has been necessary to provide expensive auxiliary equipment to perform the respective collating, carbon interleaving and glue tipping operations.

The average small job shop obvious does not have a sufficient volume of work in this particular field to warrant the purchase of the necessary specialized machines and, therefore, although they would welcome the added business, it has been necessary for them to turn down orders for this type of material in the past because they could not compete with the specialty business forms firms. It also follows that the small business whose volume of business does not permit ordering forms in large quantities, has been obligated to purchase standard forms or pay a premium price to have forms personalized or made in a special size.

It is a primary object of this invention, therefore, to provide an economical and efficient device which can be readily attached to a standard printing press and which will enable the job shop printer to produce carbon interleaved business forms at a reasonable and competitive price.

Another object of the invention is to provide a machine for interleaving and gluing carbon and printed sheets together in pad form and which preferably can be readily attached to and/or detached from a standard printing press in a matter of a few minutes without affecting the normal operation of the press.

A further object is to provide a wholly contained unitary device which is capable of interleaving and gluing sheets as they are delivered from a printing press and which is conveniently arranged to be driven from the printing press in precise synchronization therewith.

Another object is to provide a carbon interleaving device which is arranged to form carbon interleaved pads which may be constituted of any number of such sheets within the range of the device and which includes programmed means operative to prevent the gluing of a selected sheet in each set.

A still further object is to provide an interleaving device having means operatively associated with the programmed means and which are effective to prevent the feeding of a carbon sheet during selected cycles of operation.

Another object is to provide a device wherein means are provided to stop the press in the event a printed or carbon sheet is not at the required position during a certain portion of the cycle of operation and which means are automatically rendered inoperative during the remainder of the cycle.

A still further object is to provide an interleaving device wherein means are provided to render the tripping mechanism inoperative during the selected cycles wherein a carbon sheet is not to be fed.

Other objects and important advantages will become apparent from the following description and the accompanying drawings wherein:

FIGURE 7 is a view taken along line VII—VII of FIGURE 6;

FIGURES 8A and B are views of two of the cams of the programming unit;

FIGURE 9 is a view taken along line IX—IX of FIGURE 6 and showing the mechanism for actuating the programming unit;

Figure 1:
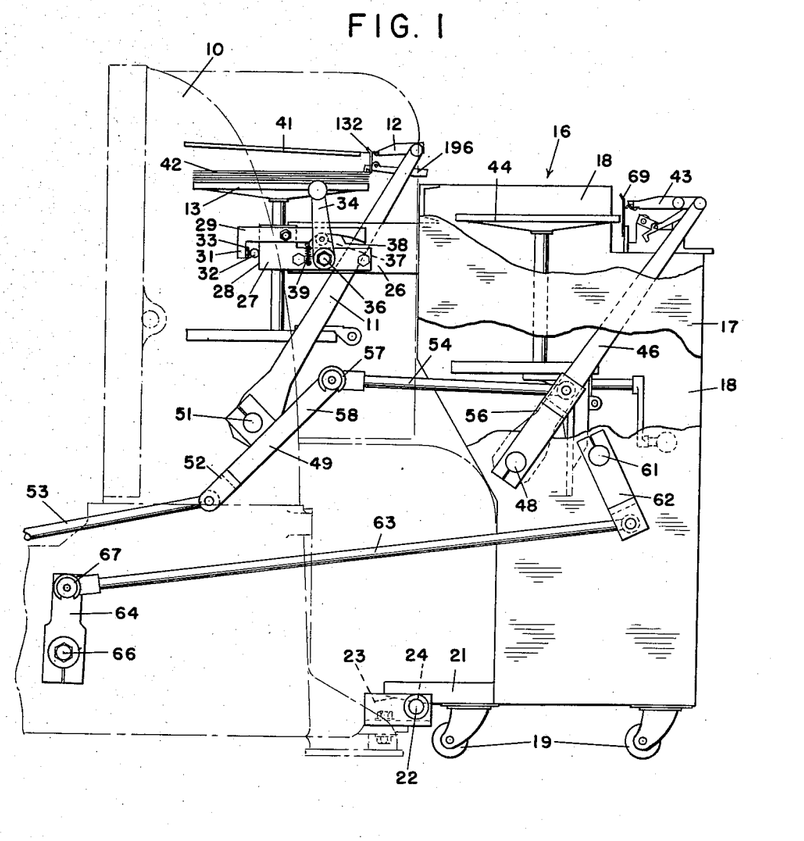
FIGURE 1 is a side elevational view of the device as attached to a conventional printing press.

With reference now to the drawings and particularly FIGURE 1 thereof a preferred embodiment of the invention is illustrated in combination with a printing press of the vertical type. Only a portion of the printing press is illustrated for the purpose of showing how the carbon interleaving device is attached thereto, but it will be understood that the printing press is of the conventional type including means for feeding sheets to an impression cylinder which functions in combination with a reciprocating bed to apply an impression on each sheet and which includes a delivery mechanism for transferring the printed sheets to a delivery pile. In the illustration the outline of the press 10 is indicated by broken lines. The delivery arms 11 also constitute an integral part of the press proper, but since they perform an essential function in combination with the interleaving device they have been illustrated in solid lines. It will be understood that one such arm is located on each side of the delivery portion of the printing press and at their free ends these arms are provided with delivery gripper elements 12 which are adapted to take each successive sheet in turn from the impression cylinder and deposit it on the delivery table 13 when the press is operated in the conventional manner.

The carbon interleaving and glue tipping device is adapted for attachment to the delivery end of the press and preferably comprises a unitary frame structure indicated by the numeral 16 which includes side frame members 17 and 18 and which frame structure is mounted on casters such as 19 so that the entire assembly can be readily moved into and out of an operative position with respect to the press. To locate the attachment accurately with respect to the press when it is moved to its operative position, the frame is provided with guide means in the form of a rearwardly projecting arm 21 at each side thereof which is adapted to have coaction with a transverse shaft 22 mounted at the base of the press frame. Each arm 21 is provided with an inclined surface 23 having a transverse notch 24 formed therein and as the assembly is pushed into position the inclined surface functions to cause the arm 21 to ride up over the shaft 22 until the notch 24 drops into interlocking relation therewith to hold the unit in position.

The arms 21 and shaft 22 serve primarily to initially locate the interleaver assembly in the proper position and additional quick release latch means are provided to positively secure the unit in its operative position. The latch means function to draw the interleaver frame tightly against the press frame and thus positively insure that the unit is accurately located relative to the press. The latch means are mounted on arms 26 that project rearwardly from the main frame on each side of the unit and consist of a plate 27 having a locating surface 28 formed on one edge thereof. A latch member 29 having a depending arm 31 is pivotally mounted on the plate 27 for movement relative thereto between a release position and a locking position with respect to a pin 32 projecting laterally from the press frame. As shown in the drawings, when the latch is in the locking position, the pin 32 is confined between the edge 28 of the plate 27 and the arcuate head of the bolt 33 in the arm 31, which bolt is provided so that adjustments can be made to eliminate any clearances between the coacting members in the locking position.

The latch member is arranged to be moved between its locking and release positions by means of the hand lever 34 which is pivoted at 36 and carries a roller 37 for engagement with the cam surface 38 on the latch member. When the hand lever is moved counter clockwise to the position shown in FIGURE 1, the roller 37 will rock the latch member in a corresponding direction to engage the pin 32 and the unit will be securely locked to the press. Upon movement of the lever 34 in clockwise direction, as viewed in FIGURE 1, the roller 37 will move away from the cam surface 38 whereupon the spring 39 connected between the latch member 29 and the plate 27, will be effective to move the latch to and thereafter maintain it in the release position.

The attachment is also provided with an intermediate station or platform 41 which is suitably supported by the frame structure in a position above the delivery table 13 when the attachment is in its operative position. The delivery grippers 12 thus deposit the printed sheets on the platform 41 and the delivery table 13 is converted into a feed table to support the pile of carbon sheets 42 that are to be interleaved with the printed sheets. As each printed sheet is deposited on the platform 41 a carbon sheet is separated from the pile 42 by means which will presently be described and its leading edge is positioned adjacent to and in accurate alignment with the leading edge of the printed sheet on the platform. The two sheets, i.e. the printed sheet and the carbon sheet, are then engaged by the auxiliary delivery grippers 43 and conveyed in superposed relation to the delivery table 44.

The delivery grippers 43 are carried at the free ends of a pair of spaced delivery arms 46 and 47 which are secured to a transverse shaft 48 journaled for rotation in the side frames 17 and 18. The auxiliary delivery arms are arranged to be driven in precise synchronization with the press delivery arms 11 by means of a lever 49 which is fixed to the end of the delivery arm shaft 51. One arm 52 of said lever is connected by means of the rod 53 to a driven member of the press, not shown, which is adapted to impart oscillating motion to the lever 49 and also to the delivery arms 11 in precise timed relationship with the press. Corresponding motion is transmitted to the auxiliary delivery arms 46 and 47 through a connecting rod 54, one end of which is pivotally connected to a drive lever 56 mounted on the shaft 48 exteriorly of the side frame member 17 and the other end of which is connected by means of a quick release coupling 57 to the other arm 58 of the lever 49.

A cam shaft 61, the purpose of which will become apparent hereinafter, is also journaled for rotation in the side frame members 17 and 18 and it is arranged to be oscillated through one complete cycle in timed relation with the oscillating movements of the delivery arms by means of a lever 62 secured to the end of said shaft and which is connected by a rod 63 to a crank 64 fixed to the main drive shaft 66 of the press. In this instance also the connection between the rod 63 and the crank 64 is effected by means of a quick release coupling 67 so that the unit can be quickly attached or detached from the press.

Figures 2, 11:
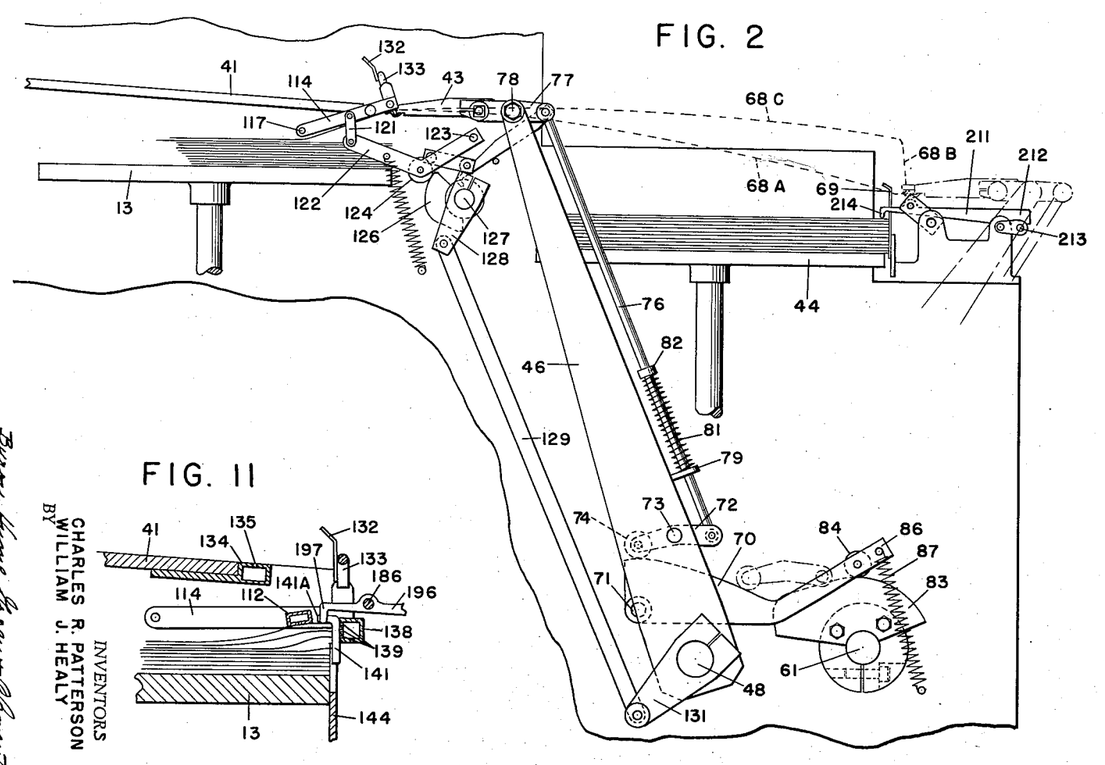
FIGURE 2 is a fragmentary side elevational view from the feed side of the press, showing the sheet conveying mechanism and the control means therefor.
FIGURE 11 is a sectional view illustrating the manner in which the carbon sheets are preliminarily separated from the pile.

With reference now to FIGURE 2, it will be seen that as the delivery grippers 43 oscillate between the platform 41 and the delivery table 44 they are caused to travel in a path defined by the dotted lines 68A, B and C. On the delivery stroke, to the right in FIGURE 2, the grippers follow the lower path 68A so that the leading edge of the sheets will be intercepted by the front pile guides 69, a series of which are arranged transversely across the front end of the delivery table and which serve to stop the forward progress of the sheets as they are released by the grippers and to align them in an even stack on the delivery table. Thereafter, the gripper elements are raised substantially vertically as indicated by the portion 68B of the path so that they will clear the tail end of the released sheet before they return to engage the next pair of sheets along the path 68C.

Control of the grippers during their cycle of operation is maintained by means of a cam 70 which is pivotally mounted at 71 on the side frame 17. This cam is adapted to control the angular position of a lever 72 which is pivotally mounted at 73 on the delivery arm 46 and which carries the cam roller 74 at one end thereof. The other end of said lever is connected by means of the rod 76 to the delivery gripper control lever 77 which is pivotally mounted at 78 on the arm 46. The rod 76 extends through the boss 79 on the arm 46 and a spring 81 is adapted to exert a constant force between the boss 79 and a collar 82 fixed to the rod 76 to thereby maintain the roller 74 against the cam 70.

As the delivery arms 46 and 47 move toward the delivery table, the roller 74 rides over the cam 70, the contour of which causes the grippers to follow the path 68A until they reach the position indicated by the broken lines in this figure. At this point the cam 70 is rocked in a counter clockwise direction about its pivot axis 71, thereby pivoting the lever 72 about its pivot axis 73, causing the grippers to move upwardly along the path 68B. Such movement of the cam 70 is effected by means of an oscillating cam 83 which is mounted on the cam shaft 61. As previously mentioned the cam shaft 61 is adapted to oscillate in timed relation to the movement of the delivery elements and thus as the delivery grippers reach the position indicated by the broken lines in FIGURE 2, the high portion of cam 83 is caused to engage and thereby raise the follower roller 84 mounted on the extension 86 of the cam 70. A spring 87 connected between the extension 86 and the frame member 17 maintains the roller 84 in contact with the cam 83.

As the delivery arms 46 and 47 move through the return stroke towards the platform 41 the cam 83 is oscillated in a counter clockwise direction thereby lowering the cam 70 so taht the grippers 43 will travel along the path 68C and will thus be in position to engage the next pair of sheets when they reach the platform 41.

Figure 3:
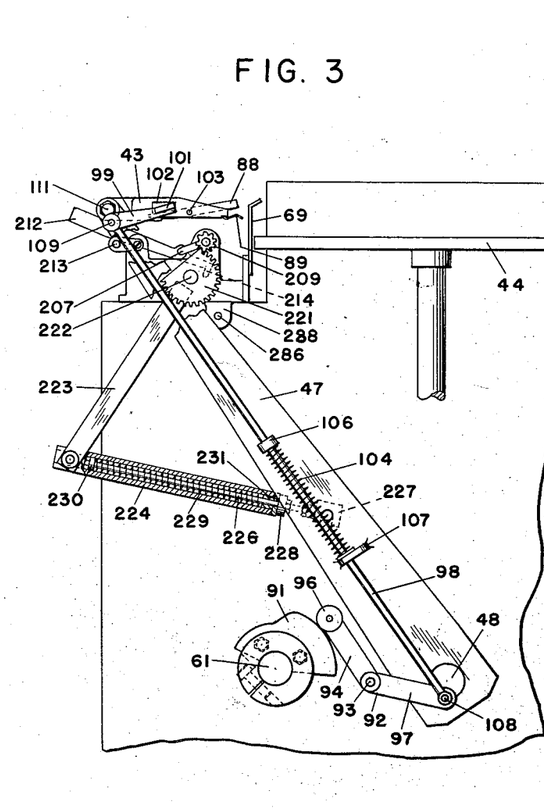
FIGURE 3 is a view similar to FIGURE 2 but taken from the drive side of the press and showing the conveyor mechanism and the means for driving the adhesive applicator for the front pile.

As the delivery arms 46 and 47 oscillate between the platform 41 and the delivery table 44 the gripper fingers 88 are opened and closed relative to their coacting pads 89, FIGURE 3, at the proper intervals in order to engage the sheets at the platform 41 and to release them over the delivery pile 44. Such action of the gripper fingers is controlled by a cam 91 which is also mounted on the oscillating cam shaft 61 and which is adapted to actuate a bell crank 92 pivotally mounted at 93 on the side frame member 18. One arm 94 of the bell crank carries a roller 96 for coaction with the cam 91 and the other arm 97 is connected to a rod 98 which extends upwardly along the delivery arm 47 and is connected to a control lever 99 at the upper end of said arm. The control lever is attached to the end of a flat, gripper finger actuating bar 101 which extends transversely across the assembly, see FIGURE 5, through openings 102 provided in each of the gripper brackets of the delivery assembly. The openings 102 are formed with an inclined bottom edge to permit downward movement of the bar 101 and it will be evident from the illustration in FIGURE 3 that when the bar 101 is depressed, due to the action of the cam 91, the fingers 88 will be pivoted about the axis 103 to open and release the sheets.

Due to the oscillating motion of the cam 91, the grippers will remain open after releasing a sheet over the delivery table and until they arrive at the sheet engaging position adjacent the platform 41. At this point the low portion of cam 91 moves under roller 96 thereby permitting the grippers to close on the next sheet to be delivered, under the influence of the compression spring 104 which is confined between the collar 106 on the rod 98 and the boss 107 on the delivery arm 47. The arrangement of the various elements is such that when the grippers are closed, the pivot axis 108 for the arm 97 and rod 98 is coincident with the axis of the delivery shaft 48 and the pivot axis 109 between the rod 98 and the control lever 99 is also coincident with the pivot axis 111 of the gripper assemblies. Consequently the oscillating movement of the delivery arms will not interfere with the proper actuation of the gripper fingers, the position of which is controlled solely by the cam 91.

Figures 10, 12:
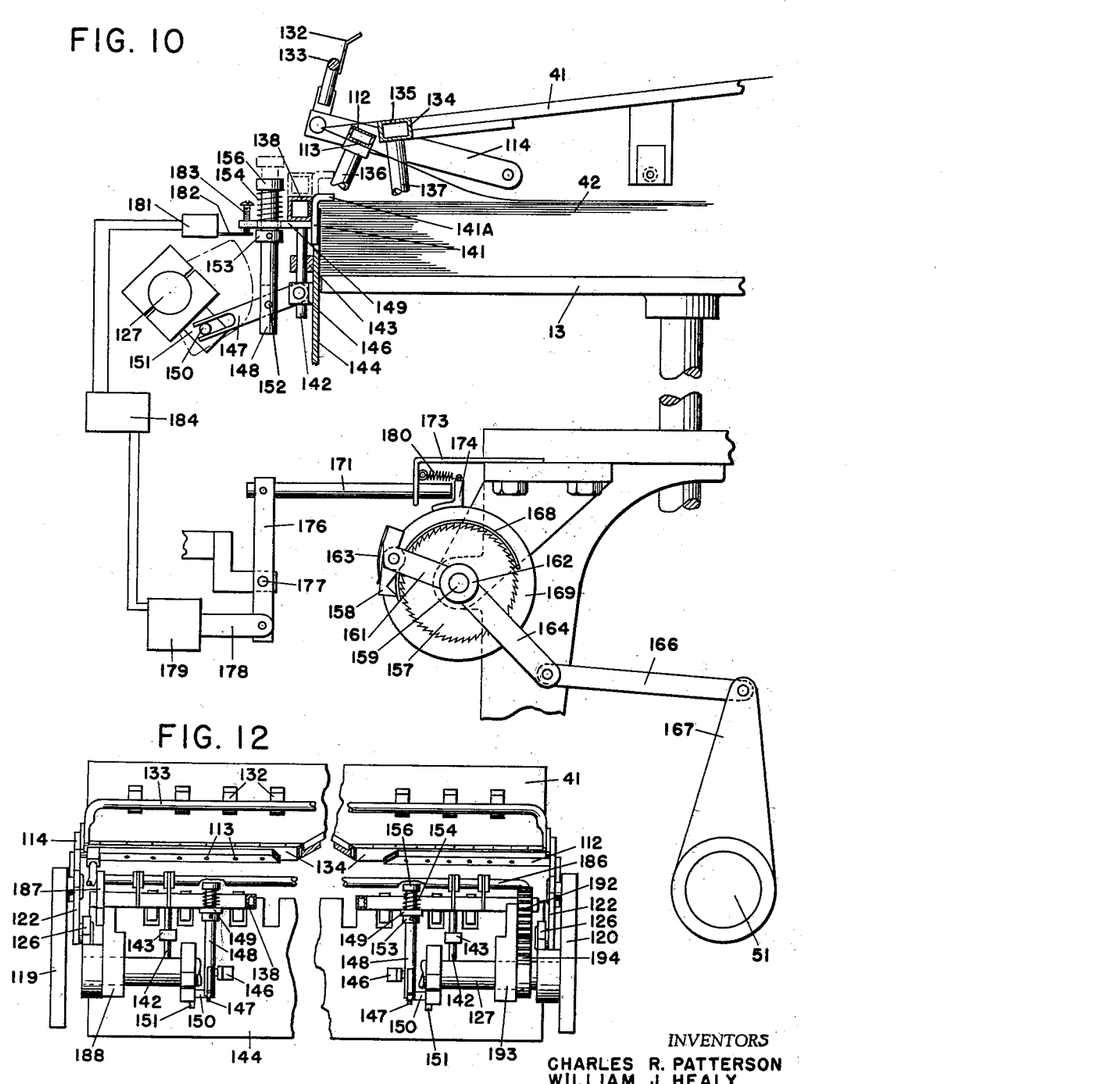
FIGURE 10 is a view, partly in section and illustrating the carbon feeding mechanism.
FIGURE 12 is an elevational view taken substantially along the line XII—XII of FIGURE 5.

As has been previously stated the delivery elements 12 function to convey a printed sheet from the impression cylinder of the press to the platform 41 at which point a carbon sheet is separated from the pile 42 and raised to a position adjacent to the sheet on the platform whereupon both sheets are engaged by the gripper elements 43 and conveyed to the delivery pile 44. The mechanism for feeding the carbon sheets in synchronization with the movements of the respective delivery elements is best shown in FIGURES 2, 10 and 11 and consists of a rectangular hollow suction bar 112 having a series of suction openings 113 in the botom face thereof. The suction bar extends across the full width of the carbon pile and is supported at each end for oscillating motion between said pile and the platform 41 by means of a lever 114 which is pivotally mounted as at 117 to extensions 119 and 120 of the side frames 17 and 18 respectively, see FIGURE 5.

The lever 114 is connected by a link 121 to the free end of an angled lever 122 which is pivotally mounted on the extension 119 as at 123 and which carries a roller 124 for coaction with an actuating cam 126. The latter cam is fixed to a transverse shaft 127 journaled in the side frame extensions 119 and 120 and which is provided with an arm 128 secured to one end thereof having connection by means of a link 129 to a lever 131 secured to the end of the delivery arm shaft 48.

As the delivery arms 46 and 47 move through their oscillating cycle it will be evident that the suction bar 112 will be oscillated in precise timed relation therewith, due to the action of the cam 126 against the roller 124 and will thus normally function to present a carbon sheet in position to be engaged by the gripper elements 43 each time said elements approach the platform 41.

The levers 114 also provide support for the guides 132 which are adapted to intercept each printed sheet as it is released by the delivery grippers 12 and to locate the leading edge of the sheet in a register position on the platform 41. A series of these guides are arranged transversely across the width of the platform 41, being fixed to a U-shaped carrier bar 133 which is secured at each end to the respective levers 114. It will be noted that the register position of the guides is slightly advanced with respect to the front edge of the platform so that the front edge of the printed sheet will project beyond the platform 41 when it is at rest at this intermediate station. This is necessary so that the suction bar 112 can be raised up under the printed sheet to thereby locate the edge of the carbon sheet closely adjacent to the leading edge of the printed sheet as illustrated in FIGURE 10.

The platform 41 is also provided with a suction chamber 134 extending across the front edge thereof and which serves to hold the printed sheet in its registered position when the front guides 132 move upwardly out of the path of the sheet as the suction bar 112 raises the edge of a carbon sheet into aligned relation therewith. The suction chamber is provided with a series of openings 135 along the top face thereof and it will be noted that both the suction bar 112 and the suction chamber 134 are connected by conduits 136 and 137 respectively to a suitable source of suction and function in a manner which will be explained more fully hereinafter.

In order to more effectively separate the carbon sheets on the pile 42 for engagement by the suction bar 112 air blast means in the form of a transverse tube 138 is located adjacent the front edge of the carbon pile in such manner that jets of air emitted through a series of openings 139 in the rear face of said tube will be directed against the topmost sheets on the pile. A series of L-shaped fingers 141 are fixed to the tube 138 at spaced intervals along the length thereof and the rearwardly projecting tips 141a of said fingers are adapted to project over the front edge of the pile so as to maintain control of the top sheets that are separated from the remainder of the pile by the air jets.

The assembly consisting of the tube 138 and fingers 141 is mounted for vertical reciprocating motion relative to the carbon pile 42 as indicated by the broken lines in FIGURE 10, by a pair of guide rods 142. One such rod projects downwardly from the tube 138 adjacent each end thereof, see FIGURE 12, and each one is slideably mounted in a boss 143 on the face of the stationary plate 144.

Mounted on the plate 144 adjacent each boss 143 is a bracket 146 which provides support for a lever 147 which is adapted to impart vertical reciprocating motion to a plunger 148 which is slideably mounted in a bracket 149 fixed to the tube 138. The lever 147 is pivotally mounted on the bracket 146 and the free end thereof is bifurcated so as to accommodate a pin 150 that projects laterally from a lever 151 mounted on the oscillating shaft 127.

The depending end of the plunger 148 in turn is slotted so as to fit over the lever 147 and it is pivotally connected to said lever by a pin 152. A collar 153 is secured to the plunger below the bracket 149 and a compression spring 154 is provided above said bracket, being confined between the bracket and the head 156 of the plunger.

Accordingly, when the device is in operation the shaft 127 will impart oscillating motion to the lever 147 through the pin 150 and the lever in turn will transmit relative vertical reciprocating motion to the plunger 148. On the upward stroke of said plunger the collar 153 will engage the bracket 149 thereby raising the tube 138 and fingers 141 to the position indicated by dotted lines in FIGURE 10. On the downward stroke however movement of the plunger is transmitted to the bracket 149 through the spring 154 and thus if the fingers 141 engage the top of the pile 42 before the plunger 148 has completed its downward stroke, continued movement of the plunger will be absorbed by the spring 154.

The manner in which the air tube 138 and the fingers 141 function to effect preliminary separation of the top sheets on the carbon pile is illustrated in FIGURE 11 wherein it will be seen that as the assembly moves to its raised position, the air jets issuing from the openings 139 tend to fluff the top sheets and raise them off the pile. The fingers 141 in turn, project over the top of the pile and thus maintain the front edge of the topmost sheet in a predetermined, elevated position for engagement by the suction bar 112. Moreover, in the event the next underlying carbon sheet or sheets tend to adhere to the suction bar when it moves upwardly to place the carbon sheet in position for engagement by the delivery grippers 43, such excess sheets will be stripped off by the fingers 141 as the latter move downwardly toward the pile.

The fingers 141 are also effectively utilized as carbon pile height detectors for maintaining the top of the carbon pile 42 at a substantially constant level as the sheets are removed therefrom. It was stated hereinabove that when the press was operated in the conventional manner, the table 13 on which the carbon sheets are supported served as the delivery table for printed sheets. Under such circumstances the table 13 is arranged to be lowered progressively by conventional means as sheets are deposited thereon to maintain the delivery pile at a constant level. When the interleaving device is attached, however, the movement of the table is reversed by reversing the position of the ratchet wheel 157 and the actuating pawl 158 so that the control shaft 159 will be rotated counter clockwise instead of clockwise as viewed in FIGURE 10. The ratchet wheel 157 is secured to the control shaft 159 and is arranged to be rotated intermittently by the pawl 158 pivotally mounted on the arm 161 of a bell crank 162 rotatably mounted on the shaft 159. A spring 163 normally urges the pawl into engagement with the ratchet.

The other arm 164 of the bell crank is connected by a link 166 to a crank 167 secured to the delivery arm shaft 51 so that continuous oscillating motion is imparted to the pawl while the device is in operation. Except for such times that the height of the pile 42 drops to a predetermined position, the pawl 158 is maintained out of engagement with the ratchet wheel 157 by a shield 168 which projects laterally from a supporting disc 169 rotatably mounted on the shaft 159 and which disc is normally maintained in an angular position such that the shield is located within the range of movement of the oscillating pawl.

When the height of the pile drops below a predetermined level however, the disc 169 is adapted to be rocked clockwise about the shaft 159 to thereby move the shield 168 from its intercepting position so that the pawl 158 will be free to engage the ratchet 157. Such intermittent movement of the disc 169 is effected by means of a rod 171 which is slidably mounted in a bracket 173 with the free end thereof adjacent a stop 174 on the disc 169. The opposite end of the rod is connected to a lever 176 which is pivotally mounted on the frame as at 177 and the depending end of said lever is connected to the plunger 178 of a solenoid 179. Accordingly, when the solenoid is energized the lever 176 will be rocked clockwise thereby causing the rod 171 to engage stop 174 and rock the disc 169 in a corresponding direction against the tension of the spring 180.

The solenoid is arranged to be energized at the proper intervals by means of a microswitch 181 which is mounted on the interleaver frame in a position wherein the control lever 182 thereof is aligned with a screw 183 mounted in the bracket 149. This screw is adjusted so that when the height of the pile is at a proper feeding level the screw will not contact the switch lever 182 by virtue of the fact that the height of the pile will prevent the fingers 141 from completing their downward stroke. As additional carbon sheets are removed from the pile however, the fingers eventually will be permitted to drop to a position wherein the screw will engage the lever 182 whereupon the microswitch will be closed to thereby energize the solenoid so that the pawl will be permitted to raise the pile to the proper level.

It will be noted that when the fingers 141 are down in the detecting position, the pawl 158 is at the end of its feeding stroke. If the solenoid is momentarily energized at this time by closing of the microswitch, the shield would be rocked from its intercepting position while the pawl is moving on its return or inactive stroke and it would return to its intercepting position before the pawl could engage the ratchet on its feed stroke. To overcome this situation, the microswitch is adapted to energize a relay or delayed action switch 184 which is interposed in the circuit and which is adapted to maintain the solenoid energized until the pawl has completed its next succeeding feed stroke. As long as the height of the pile remains below a predetermined level the solenoid will be energized during each cycle and the pawl will continue to raise the table 13. When the pile reaches the proper level, contact between the screw 183 and the switch lever 182 will be broken and the pawl will again be rendered ineffective by the shield 168. It will be evident that by adjusting the screw 183 vertically in the bracket 149 the height at which the pile is maintained can be varied to satisfy specific requirements.

The carbon and printed sheets are adapted to be glued together to form sets consisting of a predetermined number of sheets and the application of adhesive to the respective sheets is arranged to be performed by separate adhesive applicator mechanisms arranged adjacent the carbon pile 42 and the delivery table 44 respectively. These mechanisms are similar except for their respective actuating means and they closely resemble the mechanism as disclosed and claimed in United States Letters Patent 2,982,979. While reference may be had to said patent for a more detailed description of the applicator devices they will now be described with regard to their function in the present apparatus.

Figure 5:
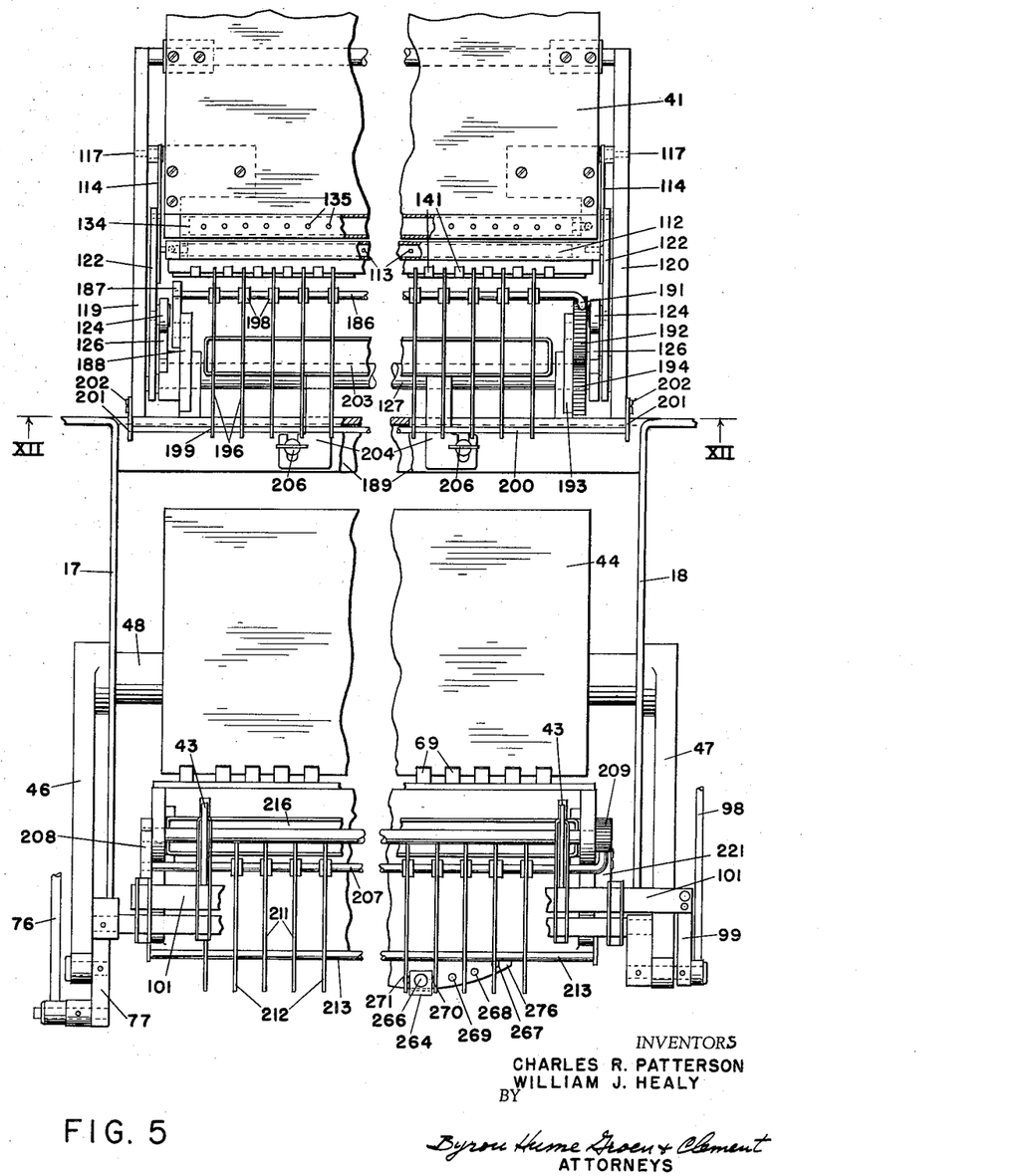
FIGURE 5 is a plan view of the complete assembly.

With particular reference to FIGURES 3 and 5, it will be seen that the adhesive applicator for the carbon sheets consists of a carrier bar 186 which is pivotally mounted at one end in a crank arm 187 which in turn is pivotally mounted on a bracket 188 that projects rearwardly from the transverse frame member 189. The other end of the carrier bar is bent so as to form a leg 191 at right angles thereto and which is inserted in an opening provided therefor in the periphery of a pinion gear 192 that is rotatably mounted on the bracket 193 projecting rearwardly from the frame member 189. A gear segment 194 mounted on the oscillatable shaft 127, which actuates the suction bar 112, is adapted to mesh with the pinion gear 192 so as to impart oscillating motion thereto.

A plurality of arms 196 having depending fingers 197 at one end thereof, are pivotally mounted on the carrier bar 186 in spaced relation along the length thereof and each one is restrained against axial movement by snug fitting rubber washers 198. The tail portion 199 of each arm is adapted to rest on a rod 200 which extends across the width of the applicator mechanism and which is supported at each end in a bracket 201 that is adjustably secured to the respective extensions 119 and 120 of the frame by means of cap screws 202. An adhesive reservoir 203 is mounted in position beneath the carrier bar 186 by means of brackets 204 that are releasably secured to the frame member 189 by wing nuts 206.

From the foregoing description it will be seen that when oscillating motion is transmitted to the carrier bar through the gear segment 194 and the pinion gear 192, the fingers 197 and the arms 196 will be caused to travel in an arcuate path between the adhesive reservoir 203, at which point they will pick up a supply of adhesive and the carbon pile 42 where they will deposit the adhesive at spaced intervals along the leading edge of the topmost carbon sheet as indicated in FIGURE 11.

During this oscillating motion the tail portions 199 of the arms 196 will slide back and forth on the rod 200 and thus the vertical position of said rod is instrumental in determining the depth to which the fingers 197 dip into the adhesive at one end of the stroke and the contact relation between said fingers and the sheets at the other end of their stroke. The position of the fingers at these two points can be varied by adjusting the vertical position of the rod 200 by loosening the cap screws 202 and moving the supporting brackets 201 in the appropriate direction.

In order that the applicator fingers 197 will not interfere with the separation and feeding of the carbon sheets, the position of the rod 200 is preferably adjusted so that the fingers will lightly engage the topmost carbon sheet while it is in the raised position as indicated in FIGURE 11.

The adhesive applicator mounted adjacent the delivery table 44 is similar to that adjacent the carbon pile 42 in that it comprises a carrier bar 207 which is mounted in a pivoted link 208 at one end with the opposite end thereof inserted in the periphery of a pinion gear 209. This bar also carries a plurality of corresponding arms 211, the tail portions 212 of which are supported on a vertically adjustable supporting rod 213 and the arms are also formed with fingers 214 that are adapted to convey adhesive from a reservoir 216 to the edges of the sheets deposited on the delivery table 44.

In this instance, however, the applicator assembly is preferably mounted in a unitary frame structure consisting of a base member 217 and the side members 218 and 219 and which frame structure may be secured to the unit frame in a manner similar to that as set forth in said Letters Patent.

The drive means for the carrier bar 207 also differs from that for the carrier bar 186 because the movement of the applicator fingers 214 is adapted to be interrupted at selected intervals as distinguished from the fingers 197 which are oscillated continuously for each cycle of operation. Accordingly, the carrier bar 207 is arranged to be driven by means of a gear segment 221, FIGURE 3, which is rotatably mounted on a stud 222 in the side frame member 219 and which gear segment has meshing relation with the pinion gear 209. A lever 223 is secured to the segment gear 221 and the depending end thereof is connected to a spring rod assembly consisting of a hollow sleeve 224 in which is slidably mounted a rod 226. The projecting end of the rod in turn is connected by means of a releasable coupling 227 to the delivery arm 47. The rod 226 is provided with a collar 228 externally of the sleeve 224 and a coil spring 229 is mounted about the rod between the collar 230 at one end thereof and the plug 231 in the end of the sleeve.

Figure 4:
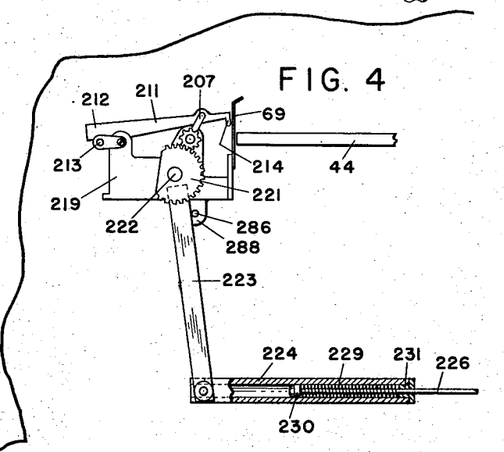
FIGURE 4 is a view illustrating the action of the applicator drive mechanism when the movement of the applicators is interrupted.

When the delivery arm moves to the left as seen in FIGURE 3, the lever 223 will be positively moved in a corresponding direction through the coaction of the collar 228 and the sleeve 224. When the delivery arm moves to the right however, the motion thereof will be transmitted to lever 223 through the resilient spring 229. The tension of the spring is such that under normal circumstances the lever 223 will be moved in precise synchronism with the arm 47 through its complete stroke. When the movement of the applicator fingers 214 is interrupted, however, as will be explained hereinafter, the lever 223 will be prevented from moving through its complete stroke, as illustrated in FIGURE 4, in which case continued movement of the delivery arm 47 will be absorbed by the spring 229 so as not to interfere with the normal delivery function of said arm.

The programming means whereby the applicator fingers 214 are prevented from depositing adhesive on a selected sheet in each set of such sheets deposited on the delivery table 44 is illustrated in FIGURES 6, 7, 8 and 9 and consists of a main shaft 236 which is rotatable in supporting brackets 237 secured to the frame member 217 and which shaft is maintained against axial movement in said brackets by the collars 238.

Figures 7, 8A, 8B, 9:
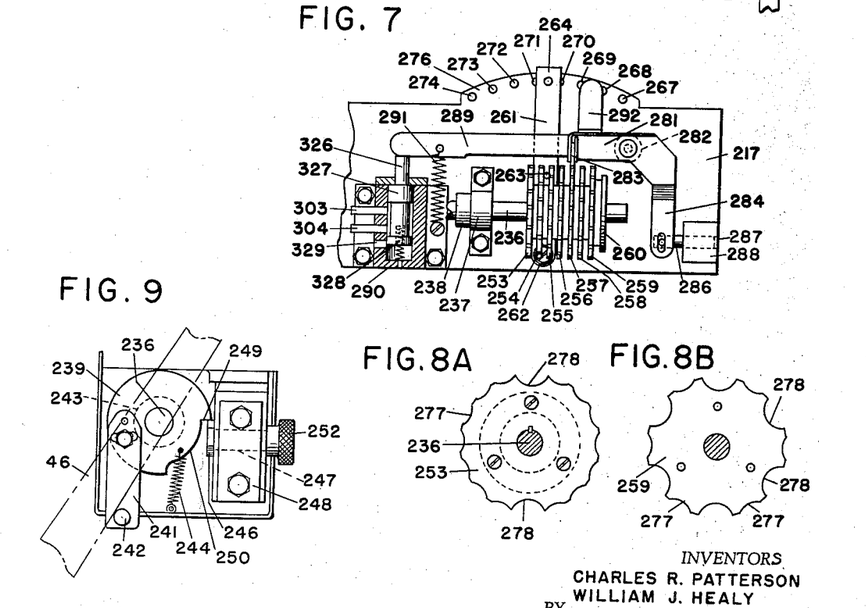

Mounted at one end of the shaft 236 is a drive disk 239 which functions to impart intermittent rotary motion to said shaft. The disc 239 is rotatably mounted on the shaft and is provided with a lever 241 having the pin 242 projecting laterally therefrom and which pin is adapted to be engaged by the delivery arm 46 each time the latter moves to the right, as in FIGURE 2, to deposit a sheet on the delivery table 44. Accordingly, the disc 239 is rocked about the axis of the shaft 236 and movement thereof in counter clockwise direction as viewed in FIGURE 9 is imparted to said shaft by any suitable one-way clutch mechanism such as is indicated at 243. As the delivery arm 46 moves to the left, the disc 239 is returned to its original position by the spring 244. The clutch mechanism, however, will release the shaft 236 during the return movement of the disc so that the motion of said disc in a clockwise direction will not be imparted to the shaft.

With reference to FIGURE 9, it will be seen that the extent of angular motion imparted to the disc 239 for each oscillation of the delivery arm 46 is dependent upon the position of a stop member 246 which limits the movement of said disc in a clockwise direction. The stop member 246 is secured to the end of a shaft 247 rotatably mounted in the housing 248 depending from the frame 217 and it is adapted to coact with a surface 249 provided at one end of the notch 250 formed in the periphery of the disc 239.

Figure 6:
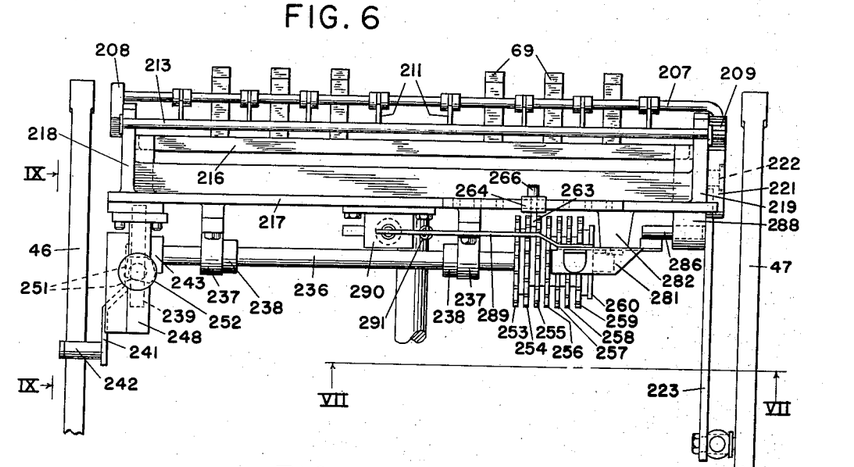
FIGURE 6 is an end view in elevation showing the programming unit for interrupting the movement of the adhesive applicators.

As may be seen best in FIGURE 6, the stop member 246 is formed with a plurality of stop surfaces 251 about its periphery, each of which is spaced at a different predetermined distance from the axis of the shaft 247 and these surfaces may be selectively positioned for coaction with the disc 239 by means of a control knob 252 on the opposite end of the shaft 247. For convenience of adjustment, the knob 252 may be marked with the letters A, B, C, etc. to correspond with the respective surfaces on the stop member.

In the present embodiment the respective surfaces 251 of the stop member 246 are spaced from the axis of the supporting shaft 247 so that in position A of the control knob, for example, the disc 239 will be limited to movement through an angle of 36°; in position B, 30°; in position C, about 25¾°; and in position D, 22½°. These figures are not to be regarded as a limitation in any respect however because the number of surfaces provided on the stop member and their location with respect to the axis of the supporting shaft may be varied to suit any specific requirements.

At the opposite end of the shaft 236 are a plurality of cams 253, 254, 255, 256, 257, 258, 259 and 260. These cams are secured together as a unit and are mounted so as to rotate with the shaft 236, but they are slidable axially thereon as may be desired to provide for the desired number of sheets of paper in each set of such sheets.

Axial adjustment of the cams is effected by means of a lever 261 which is pivotally mounted at 262 beneath the frame member 217, see FIGURE 7, and which is provided with a pin 263 that projects downwardly therefrom between two adjacent cams such as 254 and 255. The other end 264 of the lever extends around the edge of the frame member 217, see FIGURE 5, and is provided with a locking pin 266 which is adapted to be received in a selected one of the openings 267–274 located along the arcuate edge 276 of the frame member 217.

Accordingly, when the locking pin 266 is removed, the lever 261 can be swung about its pivot axis and the pin 263 will move the cam assembly axially on the shaft 236 to position a selected cam in operative position. At this point the pin 266 is inserted in the corresponding opening 267–274 to lock the lever in a stationary position.

As shown in FIGURES 8A and B each of the cams 253 to 259 inclusive consist of a round plate having notches 277 and 278 formed in its periphery. FIGURE 8A is an illustration of the cam 253 which is used when sets consisting of 8 printed sheets are to be made and it will be seen that all of the notches are located 22½° apart. The notches 278, however, are deeper than the notches 277 and are displaced 180° apart. Accordingly when 8 sheet sets are formed the stop member 246 will be positioned so that the cam will be rotated through increments of 22½° for each cycle of operation and on each eighth cycle a notch 278 will move into position to cause the interruption of the adhesive applicator at the delivery table.

FIGURE 8B illustrates the two-sheet set cam 259 having similar notches 277, 278 which, however, are displaced 30° apart with the notches 277 and 278 in alternate positions. Accordingly, when two-sheet sets are formed, the stop member 246 will be positioned so that the cam will be rotated through increments of 30° for each cycle and on each second cycle the notches 278 will be effective to interrupt the gluing operation.

The remaining cams are similarly formed and those used for the 3, 4 and 6 part sets will have 12 notches each displaced 30° apart. However, the deep notches will be located at 90°, 120° and 180° apart respectively; the 5 part cam will have 10 notches spaced 36° apart with the deep notches at 180° intervals and the 7 part cam will have 14 notches at about 25¾° intervals with the deep notches 180° apart.

The eighth cam 260 differs from the remaining cams in that it is smaller in diameter and it has a smooth periphery. This cam is used for the sole purpose of maintaining the adhesive applicator out of operation when work is to be performed on the press such as make-ready, wash-ups, preliminary inking-up, etc., at which time no sheets are being processed.

The respective cams are adapted to control the angular position of an L-shaped lever 281 which is pivotally mounted on a boss 282 extending from the bottom of the frame member 217 and which carries a roller 283 for coaction with the respective cams. The arm 284 of said lever is pivotally connected to a pin 286 slidable axially in an aperture 287 provided therefor in the boss 288 and the other arm 289 of said lever has a spring 291 connected thereto which maintains the roller 283 in contact with the periphery of a selected cam. The lever 281 also has the hand lever 292 formed thereon, FIGURE 7, which is used to hold the roller out of contact with the cams, against the tension of the spring 291, when the cams are shifted axially on the shaft 236 by means of the lever 261.

From the foregoing description it will be evident that when the interleaver attachment is in operation the adhesive applicator at the delivery pile will deposit adhesive along the top edge of each printed sheet deposited on the pile until the required number of sheets to form a set have been delivered. As the last sheet of a set is deposited a deep notch 278 of the appropriate cam 253–259 will be moved under the roller 283 thereby permitting the lever 281 to pivot counter clockwise under the influence of the spring 291 and causing the pin 286 to move axially to the right to a position wherein it projects into the path of the applicator drive lever 223, see FIGURE 4. Movement of said lever is thus interrupted thereby preventing the fingers 214 from applying adhesive on the last delivered sheet and the continued movement of the delivery arm 47 at this time is absorbed by the spring 229.

It will also be understood that upon the completion of a set of sheets on the delivery pile 44, the next sheet to be delivered will constitute the first or bottom sheet of the next set and, therefore, will not require a carbon sheet to be affixed thereto. Therefore, the programming device is adapted to trip the carbon feeder mechanism each time the adhesive applicator is tripped and this is accomplished by means of a valve 290 located in the vacuum line and which is arranged to be actuated by the arm 289.

Figure 13:
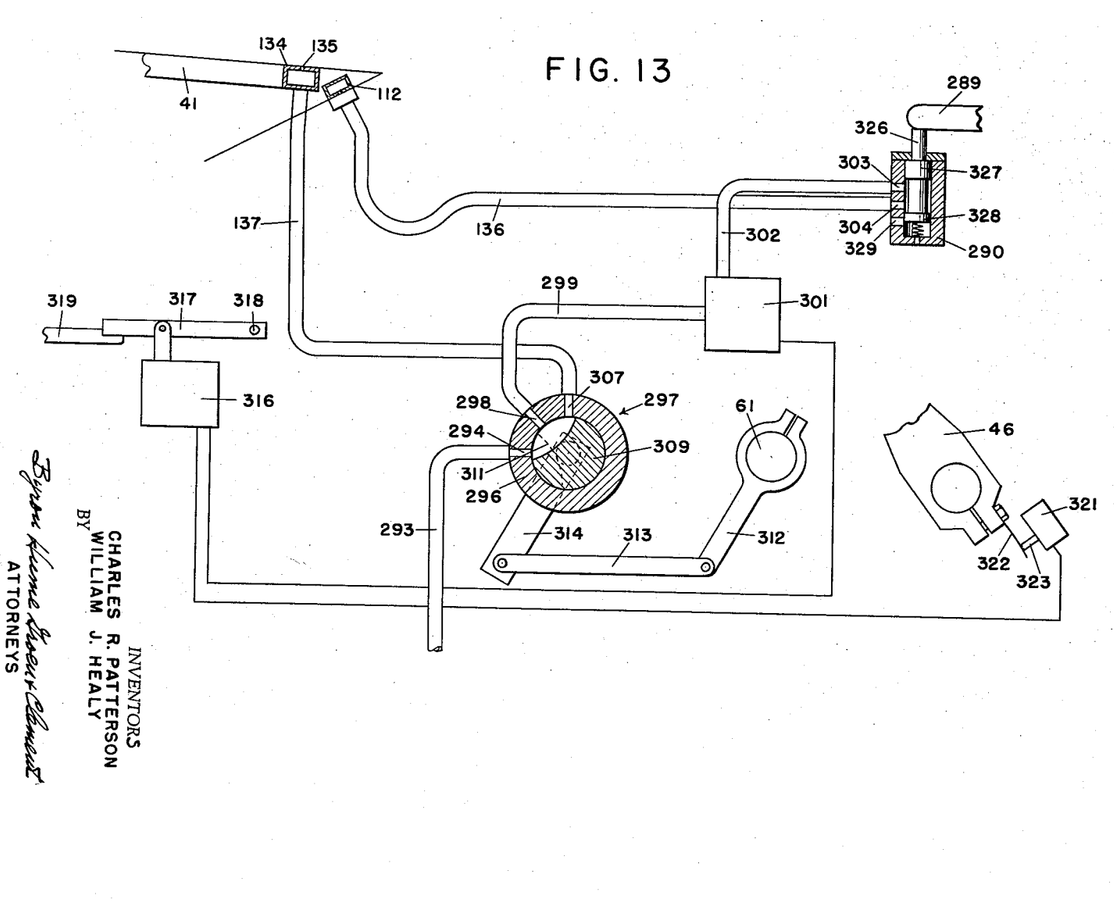
FIGURE 13 is a schematic view of the vacuum system and the means associated therewith for controlling the functions of the various elements.

With reference now to FIGURE 13 it will be seen that a conduit 293, which is connected to a suitable vacuum pump, not shown, conducts the vacuum to the opening 294 in the housing 296 of a rotary valve 297. A second opening 298 in said housing is connected by a conduit 299 to a pressure differential switch 301 and then through conduit 302 to the inlet opening 303 in the valve 290. The outlet opening 304 of said valve is in turn connected to the suction bar 112 by the flexible conduit 136.

A third opening 307 in the valve housing 296 is connected directly to the suction chamber 134 on the table 41 by the conduit 137.

The control member 309 of the valve is rotatably mounted in the housing 296 for movement between a position as indicated by the full lines in FIGURE 13 wherein the slot 311 in said control member connects the source of vacuum to the openings 298 and 307 and a shut-off position indicated by the dotted line wherein the vacuum source is shut off from the openings 298 and 307.

Movement of the control member 309 between the two positions is effected by means of an arm 312 on the oscillating cam shaft 61 and which is connected by a link 313 to the control member arm 314. The motion of the control member is timed so that as the delivery grippers complete their delivery stroke and deposit a sheet on the delivery table the control member will be moved in a clockwise direction whereupon vacuum will be communicated first to the suction bar 112 through the port 298 as the suction bar reaches its sheet engaging position. Shortly thereafter the opening 307 will be exposed and vacuum will be conducted to the chamber 134 to thereby hold the printed sheet in its registered position on the table 41 while the guides 132 move upwardly out of the path of the sheet as the suction bar 112 raises the carbon sheet for engagement by the delivery grippers.

Suction will be maintained in the suction bar 112 and the chamber 134 until the respective sheets have been engaged by the delivery grippers whereupon the valve control member 309 will close the ports 298 and 307 so as not to interfere with the delivery of the sheets.

The ports 298 and 307 will remain closed until the respective delivery grippers have reached the end of their respective delivery strokes. At this point the grippers 12 will have released the next succeeding printed sheet on the platform 41, the grippers 43 will have released the preceding printed and carbon sheets on the table 44, and the suction bar 112 will be down in its sheet engaging postion relative to the carbon pile 42. Accordingly the control member 309 will be actuated to open the ports 298 and 307 so that the suction chamber 134 will hold the printed sheet in its register position and the suction bar 112 will be rendered effective to raise the next carbon sheet for engagement by the returning grippers 43.

The pressure differential switch 301 is provided in the vacuum system to detect the presence of a printed sheet and a carbon sheet at the proper positions when the delivery grippers move to engage them. If either sheet is not present at such time, the resultant loss of vacuum in the system will cause the pressure differential switch to actuate a solenoid 316 which will depress the lever 317 pivoted on the frame at 318 and thereby actuate the trip lever 319 to stop the press.

Since the vacuum is normally cut off from the suction bar 112 and the chamber 134 during the major part of the delivery portion of the cycle, however, it is necessary to render the solenoid inoperative to trip the press during this interval. This is accomplished by means of a microswitch 321 which is connected into the circuit between the source of electrical energy and the solenoid and which switch is normally open so that the solenoid cannot be actuated. The microswitch is mounted on the interleaver frame in a position such that a resilient spring member 322, secured to the end of the delivery arm 46, will engage and depress the control element 323 of the microswitch each time the delivery grippers 43 approach their sheet engaging position relative to the platform 41. The spring is effective to depress the control element 323 shortly before the grippers reach their sheet engaging position and to maintain it depressed until the grippers have moved a short distance on their delivery stroke.

Accordingly, if a printed or carbon sheet is not in position during the sheet detecting interval, when the control element 323 is depressed the resultant loss of vacuum will actuate the pressure differential switch and since the solenoid is connected to the source of current at this time, it will be energized to trip the press. However, as the delivery arms continue their movement on the delivery stroke the spring member 322 will release the control element 323 thereby opening the circuit to the solenoid immediately before the control member 309 of the rotary valve 297 cuts off the vacuum to the bar 112 and chamber 134. Accordingly any actuation of the pressure switch when the vacuum is cut off will not actuate the solenoid 316.

By the same token, each time the programming mechanism functions to skip the feeding of a carbon sheet, it will be seen that the plunger 326 of the valve 290 will be depressed by the arm 289 thereby moving the plunger 326 to a position wherein the control surface 327 thereof will close off the port 303 and the control surface 328 will drop below the port 329 thereby connecting the suction bar to atmosphere. Consequently during the next cycle the suction bar will not feed a carbon sheet to the delivery grippers, but because the surface 327 closes the port 303 at this time, vacuum will be maintained in the remainder of the system and the pressure switch 301 will not be actuated so as to trip the press.

*Operation*

The machine is attached to a printing press in the manner above described and the various connecting rods such as 54, 63 and 226 are coupled to their respective actuating levers 49, 64 and 46. Likewise the conduit 293 for the vacuum system is connected to the inlet side of the vacuum pump of the press and a similar connection is made to the exhaust side of said pump to supply air under pressure to the air bar 138 of the carbon feed mechanism.

For the purpose of explaining the operation of the various elements it will be assumed that four part forms are to be produced each of which will be constituted of a first white sheet, a second pink sheet, a third yellow sheet, and a fourth blue sheet. Each form will also include three carbon sheets which will be inserted between the first and second, the second and third and the third and fourth printed sheets respectively. It will also be understood that before they are fed into the press, the paper sheets will be precollated in reverse order so that the first sheet to be printed and delivered will be blue, the next yellow, the next pink and the white or top sheet which constitutes the first or original of the four part form will be last.

The programming mechanism will then be adjusted to position the four part cam 257 for coaction with the roller 283 by holding the arm 292 of lever 281 and moving lever 261 until the locking pin 266 drops into the locating opening 269 on the frame member 217.

The four part cam 257, as mentioned hereinabove, has 12 notches formed in its periphery at 30° intervals with a deep notch 278 at each 120° position. Accordingly, the knob 252 will be moved to B position which will move the corresponding cam surface 251 of the stop member 246 into position for coaction with the control surface 249 of the drive disc 239 to thereby limit the angular movement of said disc to 30° for each cycle of operation.

The press is now started and permitted to run until the first sheet, which would be the blue sheet constituting the bottom sheet of the first set, is printed and conveyed to the intermediate station or table 41 by the delivery grippers 12 of the press. At this point in the cycle the adhesive applicator fingers 197 would be in the position to apply adhesive to the edge of a carbon sheet on the feed table 13, as shown in FIGURE 11, and the suction bar 112 would likewise be in position to engage the same carbon sheet and raise it into position for engagement by the delivery grippers 43. Since the blue sheet is the bottom one of a set, however, no carbon sheet is required on the bottom face thereof. Accordingly, at this point in the cycle the press is stopped and the cam 257 in the programming mechanism is indexed manually until a deep notch 278 is adjacent the roller 283. This permits the arm 289 to move counter clockwise and depress the plunger 326 of the valve 290 to thereby cut off the vacuum to the suction bar. Such movement of the arm 289 will also cause the pin 286 to be projected to its interrupting position.

The press is now ready for continuous operation and as it is restarted the respective delivery mechanisms will move toward their respective sheet engaging positions, the grippers 12 moving toward the impression cylinder to engage the next printed sheet, which would be the yellow sheet and the grippers 43 moving toward the table 41 to engage the blue sheet thereon.

Simultaneously with the movement of the delivery mechanisms, the suction bar 112 will be raised to its upper position wherein it normally maintains a carbon sheet in position for engagement by the delivery grippers 43 and the guides 132 will likewise be raised out of the path of the blue sheet on the table 41. On this particular cycle, however, the suction bar 112 will not feed a carbon sheet because the suction was cut off by actuation of the valve 290.

It also will be evident that because the stop pin 286 is in its projected position, movement of the adhesive applicator drive arm 223, FIGURE 4, will be interrupted and the applicator fingers 214 will be prevented from depositing adhesive on the delivery table 44 since no sheet has as yet been delivered thereto.

As the respective delivery mechanisms reach their sheet engaging positions, the grippers 12 will engage the printed yellow sheet on the impression cylinder and the grippers 43 will engage the blue sheet on the table 41. The respective delivery mechanisms then reverse their direction of movement and the grippers 12 will deposit the yellow sheet on the table 41 as the grippers 43 drop the blue sheet on the delivery table 44.

In the meantime, the suction bar 112 will have returned to its sheet engaging position relative to the carbon pile 42 and the front guides 132 will have been lowered to their registering position relative to the table 41.

As the delivery arm 46 approaches the end of its delivery stroke it will engage the pin 242 on the drive disc 239 thereby rocking said disc and the shaft 236 in a counter clockwise direction through an angle of 30°. Consequently the cam 257 will rotate through a similar angle thereby forcing the roller 283 out of the deep notch 278 and into the next succeeding shallow notch 277. The resultant movement of the lever 281 will retract the pin 286 and open the valve 290 to thereby connect the vacuum to the suction bar 112.

Therefore, as the respective delivery mechanisms reverse their direction of movement once again and start moving toward the sheet engaging positions on the next cycle of operation, the applicator drive lever 223 will be free to move through its complete stroke and the applicator fingers 214 will be caused to deposit adhesive on the edge of the blue sheet on the delivery table 44. Simultaneously therewith the carbon adhesive applicator fingers 197 will return to the position as shown on FIGURE 11 to deposit adhesive along the edge of the preliminarily separated carbon sheet as the suction bar 112 engages said sheet. Since the suction bar is now connected to the vacuum pump, it will raise the carbon sheet to the position as indicated in FIGURE 11 wherein the leading edge of the carbon sheet is aligned with the corresponding edge of the yellow printed sheet on the table 41. The guide fingers 132 will be raised once again out of the path of the yellow sheet and the latter will be maintained in its register position by virtue of the vacuum in the chamber 134.

As the delivery grippers 43 engage the edges of both the carbon sheet and the yellow sheet, the adhesive on the carbon sheet will cause the two sheets to adhere together in superposed relation and they will be deposited together on the delivery table 44. In the meantime the applicator fingers 214 have deposited adhesive along the edge of the blue sheet already on the delivery table so the blue sheet will be caused to adhere to the carbon and yellow sheet.

The same sequence of operation will proceed as the pink sheet is delivered and as each said sheet reaches the delivery table the cam 257 will be indexed through an angle of 30° by the coaction of the delivery arm 46 and the pin 242.

The fourth or white sheet is the last sheet of the four part form so as it and its associated carbon sheet approach the delivery table 44, the cam 257 will be indexed through the 4th angle of 30° and thus a deep notch 278 at the 120° location will move under the roller 283. Accordingly the pin 286 will be projected once again into the path of the lever 223 to prevent the finger 214 from depositing adhesive on the white sheet and the valve 290 will render the suction bar 112 inoperative to feed a carbon sheet on the next cycle during which the next blue sheet constituting the bottom sheet of the next four part set, will be delivered on the table 44.

Thus it will be seen that all of the sheets, both carbon and printed, which constitute a set will be glued together as a unit, but the respective sets will not be joined so that subsequent manual separation of the sets will not be required.

In explaining the operation of the mechanism we have not gone into a detailed description of the function of the pile height control and raising mechanism or the tripping function associated with the vacuum system. However, it will be evident that the various elements will be actuated in precise synchronism with the delivery mechanisms and in a manner as described hereinabove.

It is also to be understood that while the attachment has been described in connection with the interleaving of carbon sheets between printed sheets as they are delivered from a printing press, for which function it is primarily intended, the attachment can be used in various other ways. For example, it may be used to feed slip sheets to prevent offsetting when printing a solid form with a slow-drying ink in which case the respective adhesive applicators would be rendered inoperative. It may also be used as a self-contained unit for limited types of collating as well as to assemble carbon sheets to individual printed sheets to thereby increase the number of such sheets which can be subsequently collated in a given size collator.

It is to be understood therefore that although the application discloses a preferred embodiment of the invention having a relatively specific function, it will be apparent to those skilled in the art how it can be adapted for other purposes with but minor modifications and alterations and it is the intention to embrace all such modifications and alterations as may come within the scope of the following claims.

What is claimed is:

1. A machine for interleaving sheets comprising power driven means for advancing a plurality of first sheets in seriatim relation to a first station, a support for a stack of second sheets to be interleaved with said first sheets, feed means for separating a second sheet from said stack and for positioning an edge thereof adjacent the corresponding edge of a first sheet at said first station, a delivery station, and means for engaging said first and second sheets at said first station and for transferring said sheets in superposed relation from said first station to said delivery station.

2. A machine for interleaving sheets comprising power driven means for advancing a plurality of first sheets in seriatim relation to a first station, a support for a stack of second sheets to be interleaved with said first sheets, feed means for separating a second sheet from said stack and for positioning an edge thereof adjacent the corresponding edge of a first sheet at said station, a delivery station, conveyor means having elements to engage said first and second sheet at said first station, and means connected to said power driven means for driving said conveyor means whereby to transfer said first and second sheet in superposed relation from said first station to said delivery station.

3. A machine for interleaving first and second sheets to form sets consisting of two or more such sheets comprising a first sheet conveyor for delivering a plurality of first sheets in seriatim relation to a first sheet support, a second support for a stack of said second sheets, feed means for separating a second sheet from said stack and for positioning one edge of said second sheet adjacent to and in alignment with a corresponding edge of a first sheet on the first sheet support, a third support, and second sheet conveying means for engaging the aligned edges of said first and second sheets adjacent said first sheet support and for transferring said sheets in superposed relation to said third support.

4. A machine for interleaving first and second sheets to form sets consisting of two or more such sheets comprising a driven sheet conveyor for depositing a plurality of first sheets in seriatim relation upon a first sheet support, a table for supporting a stack of second sheets, feed means for separating a second sheet from said stack and for positioning one edge of said second sheet adjacent to and in alignment with a corresponding edge of a first sheet on said first sheet support, a second support, a second sheet conveyor for engaging the edges of said first and second sheets adjacent said first support and for transferring said sheets in superposed relation to said second support, means connecting the second conveyor to the driven conveyor for driving the second conveyor in synchronization with the driven conveyor, and means actuated by said second conveyor for driving the said feed means in synchronization with both said conveyors.

5. A machine for interleaving first and second sheets to form sets consisting of a predetermined number of such sheets comprising a first sheet conveyor for delivering a plurality of first sheets in seriatim relation to a first sheet support, a table for supporting a stack of second sheets, feed means for separating a second sheet from said stack and for positioning one edge of said second sheet adjacent to and in alignment with a corresponding edge of a first sheet on the first sheet support, a second support, a second sheet conveyor for engaging the aligned edges of said first and second sheets and for transferring said sheets in superposed relation to said second support, counter means responsive to the movement of the second conveyor for registering the number of sheets deposited on said second support, and means responsive to said counter means upon reaching a predetermined count for rendering said feed means inoperative to feed a second sheet during the next succeeding cycle of operation.

6. A machine for interleaving carbon sheets between alternate paper sheets to form sets consisting of two or more paper sheets comprising a first sheet conveyor for advancing a plurality of paper sheets in seriatim relation to a station, a feed table for supporting a stack of carbon sheets, adhesive applicator means located adjacent said feed table, means for actuating said applicator means to apply adhesive to an edge of each succeeding carbon sheet on said table, feed means for separating a carbon sheet from said stack and for positioning the adhesive edge thereof adjacent to and in alignment with a corresponding edge of a paper sheet at said station, a delivery table, and a second sheet conveyor having means to engage the aligned edges of the paper and carbon sheet at said station and to transfer said sheets in superposed relation to the delivery table.

7. A machine for interleaving carbon sheets between succeeding paper sheets to form sets consisting of two or more paper sheets comprising a first sheet conveyor for advancing a plurality of paper sheets in seriatim relation to a station, a feed table for supporting a stack of carbon sheets, adhesive applicator means located adjacent said feed table, means for actuating said applicator means to apply adhesive to an edge of each succeeding carbon sheet on said table, feed means for separating a carbon sheet from said stack and for positioning the adhesive bearing edge thereof adjacent to and in alignment with a corresponding edge of a paper sheet at said station, a delivery table, a second sheet conveyor having means to engage the aligned edges of the paper and carbon sheet at said station and to transfer said sheets in superposed relation to the delivery table, programmed means adapted to be actuated by said second conveyor each time said sheets are deposited on said delivery table, and means adapted to be actuated by said programmed means each time the latter means reaches a predetermined position for rendering said feed means inoperative to feed a carbon sheet during the next succeeding cycle of operation.

8. A machine for interleaving carbon sheets between alternate printed sheets to form sets consisting of two or more such printed sheets comprising a first sheet conveyor for delivering printed sheets in seriatim relation to a sheet support, a feed table for supporting a stack of carbon sheets, adhesive applicator means located adjacent said feed table, means for actuating said applicator means to apply adhesive to an edge of each succeeding carbon sheet on said table, feed means for separating a carbon sheet from said stack and for positioning the adhesive bearing edge thereof adjacent to and in alignment with a corresponding edge of a printed sheet on said support, a delivery table, a second sheet conveyor for engaging the aligned edges of the printed and carbon sheet and for transferring said sheets in superposed relation to the delivery table, a second adhesive applicator located adjacent the delivery table, and means for actuating said second applicator to apply adhesive to the corresponding edge of each printed sheet deposited on said delivery table.

9. A machine for interleaving and gluing sheets to form sets consisting of a preselected number of sheets comprising driven means for advancing a plurality of first sheets in seriatim relation to a station, a table for supporting a stack of second sheets to be interleaved with said first sheets, feed means for separating a second sheet from said stack and for positioning one edge thereof adjacent the corresponding edge of a first sheet at said station, a delivery table, conveyor means having movement between said station and said delivery table, means carried by said conveyor means for engaging said first and second sheets at said station and for conveying them in superposed relation for deposit on said delivery table, adhesive applicator means located adjacent said delivery table, means responsive to the movement of said conveyor means for actuating said applicator to deposit adhesive on the edge of the top sheet of the set as it is deposited on the delivery table, adjustable interrupting means operatively connected to said conveyor means for preventing said applicator means from depositing adhesive on a selected sheet in each of said sets of sheets, and means responsive to actuation of said interrupting means for rendering said feed means inoperative to feed a second sheet during the next cycle of operation.

10. A machine for interleaving and gluing sheets to form sets consisting of a preselected number of sheets comprising driven means for advancing a plurality of first sheets in seriatim relation to a station, a table for supporting a stack of second sheets to be interleaved with said first sheets, an adhesive applicator located adjacent said table for applying adhesive to the edge of each succeeding second sheet on said table, feed means for separating a second sheet from said stack and for positioning the adhesive bearing edge thereof adjacent the corresponding edge of a first sheet at said station, a delivery table, conveyor means having movement between said station and the delivery table, sheet engaging elements carried by said conveyor for engaging said first and second sheets at said station and for conveying them in superposed relation to the delivery table, a second adhesive applicator located adjacent the delivery table, means responsive to the movement of said conveyor for actuating said second applicator to deposit adhesive on the edge of each first sheet deposited on the delivery table, adjustable interrupting means operatively connected to said conveyor for preventing said second applicator from depositing adhesive on a selected first sheet in each of said sets of sheets, and means responsive to actuation of said interrupting means for rendering said feed means inoperative to feed a said second sheet during the next cycle of operation.

11. A machine for interleaving carbon sheets between alternate printed sheets to form sets consisting of two or more printed sheets comprising a first sheet conveyor for delivering printed sheets in seriatim relation to an intermediate station, a feed table located beneath said station for supporting a stack of carbon sheets, adhesive applicator means located adjacent said feed table, means for actuating said applicator means to apply adhesive to an edge of each succeeding carbon sheet on said table, feed means for separating a carbon sheet from said stack and for positioning the adhesive bearing edge thereof adjacent to and in alignment with a corresponding edge of a printed sheet at said station, a delivery table, a second sheet conveyor for engaging the aligned edges of the printed and carbon sheet at said station and for transferring said sheets in superposed relation to the delivery table, a second adhesive applicator located adjacent the delivery table, means connected to said second sheet conveyor for driving said second adhesive applicator to apply adhesive to the corresponding edge of each printed sheet deposited on the delivery table, and adjustable interrupting means for preventing said second adhesive applicator from applying adhesive to a selected sheet in each of said sets of sheets.

12. In a machine of the class described, the combination comprising conveyor means for advancing a first sheet to a station, suction means at said station for maintaining control of the first sheet upon its release by said conveyor, a feed table for supporting a stack of carbon sheets adjacent said station, feed means including a suction member for separating a carbon sheet from said stack and for positioning an edge thereof in contact with the corresponding edge of the first sheet at said station, a source of suction for said suction means and for said suction member, valve means, means for actuating said valve means whereby the source of suction is connected to said suction means and said suction member for a predetermined period in the cycle of operation, pressure differential means for detecting the presence of a sheet at said suction means and at said suction member during said predetermined period, and tripping means responsive to actuation of said pressure differential means for stopping the machine if a sheet is not engaged by said suction means or said suction member during said predetermined period of the cycle.

13. In a machine of the class described, the combination comprising conveyor means for advancing a first sheet to a station, suction means at said station for maintaining control of the first sheet upon its release by said conveyor, a feed table for supporting a stack of carbon sheets adjacent said station, feed means including a suction member for separating a carbon sheet from said stack and for positioning an edge thereof in contact with the corresponding edge of the first sheet at said station, a source of suction for said suction means and for said suction member, valve means, means for actuating said valve means whereby the source of suction is connected to said suction means and said suction member for a predetermined period in the cycle of operation, pressure differential means for detecting the presence of a sheet at said suction means and at said suction member during said predetermined period, tripping means responsive to actuation of said pressure differential means for stopping the machine if a sheet is not engaged by said suction means or said suction member during said predetermined period of the cycle, and means for rendering said tripping means inoperative during the remainder of the cycle.

14. In a machine of the class described, the combination comprising, conveyor means for advancing a first sheet to a station, suction means at said station for maintaining control of the first sheet upon its release by said conveyor, a feed table for supporting a stack of carbon sheets adjacent said station, feed means including a suction member for separating a carbon sheet from said stack and for positioning an edge thereof in contact with the corresponding edge of the first sheet at said station, second conveyor means for engaging said first sheet and said carbon sheets and for conveying said sheets in superposed relation to a delivery pile, a source of suction for said suction means and for said suction member, a control valve, means for actuating said control valve whereby the suction source is connected to said suction means and to said suction member during a predetermined portion of the cycle of operation, pressure differential means for detecting the presence of a sheet at said suction means and at said suction member during said predetermined portion of the cycle, tripping means responsive to actuation of said pressure differential means for stopping the machine if a sheet is not engaged by said suction means or by said suction member during said predetermined portion of the cycle, and means responsive to the movement of said second conveyor means for rendering said tripping means inoperative during the remainder of the cycle.

15. In a machine of the class set forth the combination comprising a sheet support, power driven means for advancing a sheet to said support, front guide means for locating the sheet in a register position on said support, means mounting said front guide means for movement between a register position with respect to a sheet on said support and an inoperative position wherein said guide means are raised out of the path of said sheet, a feed table located below said support for supporting a stack of sheets, feed means having a sheet engaging position relative to the top sheet on said stack and a sheet registering position wherein the leading edge of said top sheet is located in register with the edge of the sheet on said support, means for actuating said feed means between the sheet engaging and the sheet registering position, means interconnected between said front guide means and said feed means for actuating said guide means between the said register and inoperative positions in unison with said feed means, and conveyor means having elements adapted to engage the edges of both of said sheets at the register position and transfer them in superposed relation to a delivery pile.

16. A machine for interleaving first and second sheets to form sets consisting of two or more such sheets comprising a first sheet conveyor for delivering a first sheet to a first sheet support, an adjustable table for supporting a stack of second sheets below said first support, feed means for separating a second sheet from said stack, means for actuating said feed means to position one edge of said separated second sheet adjacent the corresponding edge of the first sheet on said first support, a delivery table, a second sheet conveyor including a pair of oscillating arms having sheet engaging elements for transferring said first and second sheets in superposed relation from the first support to said delivery table, normally inoperative, continuously oscillating means having operation when actuated to impart intermittent vertical motion to said table, and detector means responsive to the height of said stack for actuating said oscillating means at selected intervals to thereby maintain the top of said stack at a predetermined level.

17. In a machine of the class set forth having a support and means for advancing a sheet to a position on said support, in combination, means for positioning the leading edge of a second sheet in register with the corresponding edge of the sheet on said support comprising, a feed table for supporting a stack of said second sheets below said support, means for preliminarily separating the leading edges of the top sheets on said stack including a transversely disposed air tube located adjacent the front edge of the stack near the top thereof, a series of ports in said air tube adapted to direct jets of air against the front face of the stack whereby to fluff the leading edges of the topmost sheets, a series of fingers mounted on said tube in a manner that they project over the front edge of the stack, means mounting said tube and therewith said fingers for vertical reciprocation between a raised position wherein said fingers are raised above the normal level of said stack and a lowered position wherein said fingers rest on said stack, said air jets being effective to separate the leading edge of the topmost sheet during the upward movement of said tube and to maintain it in contact with said fingers in their raised position, oscillatable feed means including a sheet engaging element having operation to engage the top sheet in the raised position and to thereafter position the leading edge of said top sheet in register with the corresponding edge of the sheet on said support, and conveyor means having elements adapted to engage the registered edges of both said sheets and convey them to a delivery pile.

18. A machine for interleaving carbon sheets between alternate printed sheets comprising power driven means for advancing a printed sheet to a station, a feed table for supporting a pile of carbon sheets adjacent said station, feed means for separating a carbon sheet from said pile and for positioning an edge thereof adjacent the edge of the printed sheet at said station, said feed means including means mounted adjacent the front edge of the pile for preliminarily separating the edges of the topmost carbon sheets, tripper fingers having operation to maintain control of the preliminarily separated carbon sheets until they are engaged by said feed means, means for reciprocating said stripper fingers between a raised position wherein they maintain the edge of a separated sheet in position for engagement by said feed means and a lowered position wherein the fingers rest on the top of the pile, means including a normally inoperative, continuously oscillating member for imparting intermittent vertical movement to the feed table as the carbon sheets are withdrawn to thereby maintain the top of the pile at a substantially constant level, and means adapted to be actuated by said fingers when the height of the pile permits said fingers to reach a predetermined point in their lowered position for rendering said normally inoperative member operative to raise said table.

References Cited in the file of this patent

UNITED STATES PATENTS

| | | |
|---|---|---|
| 1,440,856 | Westcott | Jan. 2, 1923 |
| 2,640,695 | Nelson | June 2, 1953 |
| 2,819,074 | Williams | Jan. 7, 1958 |
| 2,892,627 | Newhouse | June 30, 1959 |
| 2,972,477 | Austin | Feb. 21, 1961 |
| 3,019,013 | Didde et al. | Jan. 30, 1962 |